Patented Feb. 4, 1941

2,230,686

UNITED STATES PATENT OFFICE 2,230,686

METHOD OF PREPARING AZO DYESTUFFS CONTAINING METAL

Karl Holzach and Helmut Pfitzner, Ludwigshafen-on-the-Rhine, Germany, assignors to General Aniline & Film Corporation, a corporation of Delaware No Drawing. Application August 5, 1939, Serial No. 288,584. In Germany August 19, 1938

5 Claims. (Cl. 260—145)

The present invention relates to a new and improved method of preparing azo dyestuffs containing metal.

The conversion of azo dyestuffs which are difficultly soluble or insoluble in water into their complex metal compounds frequently offers difficulties. Various processes have been proposed to overcome such difficulties. Thus it has been proposed to metallize the azo dyestuffs free from metal in the presence of organic solvents, such as monohydric or polyhydric alcohols, triethanolamine or ketones, or of organic bases containing no hydroxyl groups, or to cause metal hydroxides or their reaction products with organic hydroxyl-group-containing compounds to act on the azo dyestuffs in the presence of alkalies. The introduction of complex combined metal in an alkaline medium in the presence of salts of aliphatic hydroxycarboxylic acids has also already been recommended.

We have now found that azo dyestuffs containing metal can be prepared in a specially advantageous manner by subjecting difficultly soluble or insoluble azo dyestuffs which are capable of conversion into complex metal compounds to a heating with agents supplying metal in the presence of acid amides or ammonium salts of carboxylic acids or mixtures thereof.

As initial materials there may be mentioned the azo dyestuffs free from sulfonic acid groups obtained by the action of diazotized ortho-hydroxy-, alkoxy- or carboxyarylamines on compounds coupling in ortho-position to a hydroxy group, or also azo dyestuffs derived from such diazotized amines and amines coupling in ortho-position to an amino group. Suitable agents supplying metal are in particular the hydroxides or salts of metals capable of forming complexes, such as aluminum, chromium, manganese, iron, cobalt, zinc, vanadium, titanium, zirconium, thorium, nickel, copper, tin or lead. Two or more different metal compounds may also be allowed to act simultaneously or consecutively on the initial dyestuffs in order to produce azo dyestuffs having more than one metal combined as a complex.

Among suitable acid amides there may be mentioned for example the amides of low molecular fatty acids, such as formamide, acetamide, propionic acid amide or butyric acid amide and also benzamide, and amides of dibasic acids, such as malonic acid diamide or urea and also urethanes. Mixtures of amides may also be used. Suitable ammonium salts are in particular the neutral ammonium salts of low molecular fatty acids, such as ammonium formate and acetate.

The reaction is preferably effected by mixing the initial dyestuffs with the carboxylic acid amide or the ammonium salt and the necessary amount of the metal compound, which may be dissolved in water, and heating the mixture, usually to temperatures between 100° and 150° C., until the formation of the metal complex is completed. By suitable choice of the acid amide or the ammonium salt it is possible to maintain higher or lower temperatures within the above defined range during the reaction without it being necessary to work under pressure.

The procedure may also be that a carboxylic acid amide is first heated with an aqueous metal salt solution containing the water necessary for the saponification of the amide, the metallization then being carried out in the mixture thus formed. Mixtures of different ammonium salts or mixtures of ammonium salts with carboxylic acid amides may also be made.

As compared with the introduction of complex combined metal in the presence of the usual organic solvents, the use of acid amides or ammonium salts offers the advantage that it is possible to work without the use of pressure or reflux cooling, i. e. in open vessels, even at temperatures considerably above 100° C. Moreover the metal compound formed may be readily separated from the reaction mixture by dilution with water or organic solvents and washed, the amide or ammonium salt remaining in solution. Compared with metallizing processes which are carried out in organic bases, the new process offers the advantage that the distilling off of the bases after the reaction, which is frequently necessary, the hygienic protective measures therefore necessary and the impairing of the separated dyestuff by the unpleasant odor of the readily adhering bases are all avoided. Since the acid amides and ammonium salts are neutral bodies, the new process also renders it possible to avoid the difficulties which often occur when working in alkaline or acid medium by reason of decomposition of the dyestuff. The new process may therefore be used for all dyestuffs, whereas the known processes are always limited to certain groups of dyestuffs. The present process is especially suitable for the introduction of complex combined metal into ortho-alkoxy-azo dyestuffs with the simultaneous splitting off of the alkoxy groups; this may also be effected without the use of pressure.

The following examples will further illustrate how the said invention may be carried out in practice, but the invention is not restricted to these examples. The parts are by weight.

*Example 1*

34 parts of the azo dyestuff from diazotized 1-amino-2-hydroxy-4-nitrobenzene and 1-phenyl-3-methyl-5-pyrazolone are introduced into a mixture of 150 parts of formamide and a concentrated aqueous solution of chromium formate corresponding to 5 parts of chromium oxide, the whole being heated for six hours at 110° C. while stirring. The reaction mixture is then poured into a large amount of water and the deposited dyestuffs is filtered off by suction and dried. The azo dyestuff containing chromium thus obtained dissolves in organic solvents and cellulose nitrate lacquers giving a bluish red coloration. The same dyestuff is obtained by using acetamide, propionic acid amide, butyric acid amide, benzamide or urethane instead of formamide.

*Example 2*

34.2 parts of the azo dyestuff from diazotized 1-amino-2-hydroxy-5-nitrobenzene and acetoacetic acid anilide are introduced into a solution, preheated to 100° C., of 12.5 parts of cobalt acetate in 100 parts of formamide, the whole then being stirred for five hours at 100° C. The reaction mixture is poured into water, stirred for some time and the precipitated azo dyestuff containing cobalt is filtered off by suction and dried. It dissolves in cellulose nitrate lacquers and organic solvents giving a yellow coloration. The azo dyestuffs containing chromium or nickel prepared in a corresponding manner give similar colors.

*Example 3*

30 parts of the azo dyestuff from diazotized 1-amino-2-hydroxy-5-chlorbenzene and 2-hydroxynaphthalene are added to a solution of 15 parts of ferric chloride (FeCl₃.6H₂O) and 25 parts of sodium acetate in 200 parts of formamide and the whole is heated for four hours at 110° C. The reaction mixture is then diluted with a large amount of water and the complex iron compound of the azo dyestuff thus precipitated is filtered off by suction and dried. It dissolves in cellulose nitrate lacquers giving a brown-black coloration.

The cobalt compound of the same azo dyestuff prepared in a corresponding manner yields bluish red solutions and the chromium compound yields violet solutions.

If the reaction be carried out with the azo dyestuff from diazotized 1-amino-2-hydroxy-4-nitrobenzene and 2-hydroxynaphthalene, a violet-brown iron compound, a violet cobalt compound and a blue chromium compound are obtained. The azo dyestuff from diazotized 1-amino-2-hydroxybenzene - 5 - sulphamide and 2-hydroxynaphthalene yields a bluish red cobalt compound.

*Example 4*

33 parts of the azo dyestuff from diazotized 1-amino-2-hydroxy-5-chlorbenzene and 1-phenyl-3-methyl-5-pyrazolone are introduced into a solution of 25 parts of nickel acetate in 150 parts of formamide and the whole is heated for three hours at 110° C. By pouring the reaction mixture into water, the complex nickel compound of the azo dyestuff is separated and it is dried. It dissolves in organic solvents giving a yellow coloration. The corresponding aluminum compound yields yellowish orange shades. Similar are the properties of the cobalt compound prepared under the same conditions in a urea melt. The chromium compound yields reddish orange solutions.

*Example 5*

27.5 parts of the dyestuff from diazotized 1-amino-2-hydroxy-5-nitrobenzene and 1.3-dihydroxybenzene are added to a solution of 24 parts of aluminum potassium sulphate in 180 parts of formamide; 30 parts of sodium acetate are then added and the whole heated for from four to five hours at 100° C. The azo dyestuff containing aluminum deposited by diluting the reaction mixture with water imparts a yellowish red color to cellulose nitrate lacquer. The solutions of other complex metal compounds of the same azo dyestuff prepared in the same way are, in the case of iron reddish brown, in the case of cobalt brown-red, in the case of nickel brown-orange, in the case of manganese red-brown, in the case of chromium dark red and in the case of zinc brownish yellow.

*Example 6*

To a mixture heated to 100° C. of 200 parts of acetamide and a concentrated aqueous solution of chromium formate prepared from 8 parts of chromium oxide and 10 parts of formic acid there are added 31.5 parts of the azo dyestuff from diazotized 1-amino-2-methoxy-5-chlorbenzene and 2-hydroxynaphthalene and the whole is heated for seven hours at 135° C. while stirring. The methyl group is split off during the chroming. After washing out the acetamide with water, a violet dyestuff is obtained which is the same as the dyestuff described in Example 3. The complex cobalt compound prepared in a corresponding manner is bluish red.

*Example 7*

32 parts of the azo dyestuff from diazotized 1-amino-2-methoxy-4-nitro-5-chlorbenzene and 4-methylphenol are heated with a solution of 15 parts of cobalt acetate in 150 parts of acetamide for five hours at 130° C. The reaction mixture is then diluted with a large amount of water and the deposited azo dyestuff containing cobalt is filtered off by suction and dried. It colors cellulose ester lacquers violet shades. The complex chromium compound of the same azo dyestuff is also violet. The azo dyestuff from diazotized 1-amino - 2 - methoxy-4-nitro-5-chlorbenzene and 2-hydroxynaphthalene yields under the same conditions a reddish blue chromium compound and a violet copper compound.

*Example 8*

64.5 parts of the azo dyestuff from diazotized 1-amino-benzene-2-carboxylic acid and 1-phenyl-3-methyl-5-pyrazolone are heated with a mixture of 200 parts of formamide and a chromium acetate solution corresponding to 10 parts of chromium oxide for from three to four hours at 110° C. and the reaction mixture is then poured into water. The deposited azo dyestuff containing chromium dissolves in cellulose nitrate lacquers and organic solvents giving a yellow coloration. The azo dyestuff from diazotized 1-aminobenzene-2-carboxylic acid and 2-hydroxynaphthalene yields a red chromium compound.

*Example 9*

26.5 parts of the azo dyestuff from diazotized 1-amino-2-hydroxybenzene and 2-aminonaphthalene are heated with a chromium formate solution prepared from 6 parts of chromium oxide and 8 parts of formic acid in 200 parts of formamide for ten hours at 120° C. The azo dyestuff containing chromium obtained is deposited by the addition of water, filtered off by suction and dried. It is a black-green powder which dissolves in cellulose nitrate lacquers giving a blue-green coloration. By using 1-amino-2-hydroxy-5-chlorbenzene or 1-amino-2-hydroxybenzene-5-sulphamide as diazo components, similar chromium compounds are obtained.

Example 10

To a solution of 13 parts of cobalt acetate in 150 parts of formamide there are added while stirring vigorously 31 parts of the azo dyestuff from diazotized 1-amino-2-hydroxy-4-nitrobenzene and 2-aminonaphthalene and the whole is heated for from four to five hours at 110° C. By pouring the reaction mixture into a large amount of water, the cobalt compound of the azo dyestuff formed is precipitated. It is filtered off by suction and dried. The blue-black powder thus obtained dissolves in organic solvents giving a greenish blue coloration.

By using 1-amino-2-hydroxy-5-chlorbenzene as the diazo component, a cobalt compound giving a reddish blue color is obtained whereas with 1-amino-2-hydroxy-4-nitro-5-chlorbenzene a cobalt compound giving a blue color is obtained.

Example 11

28 parts of the disazo dyestuff from one molecular proportion of tetrazotized 4.4'-diamino-3.3'-dimethoxy-diphenyl and two molecular proportions of 2-hydroxynaphthalene are added to a solution, heated to 115° C., of 25 parts of copper acetate in 200 parts of formamide and the whole is stirred at the said temperature for from three to four hours. The copper compound, separated by the addition of a large amount of water, and which has been formed by the splitting off of the methyl radicle from the methoxy groups, is washed with water and then dried. It is a crystalline powder having a bronze luster and a clear blue proper color. It may serve as a pigment dyestuff.

Example 12

To a mixture of 100 parts of formamide and a chromium formate solution corresponding to 8 parts of chromium oxide there are added 21 parts of the disazo dyestuff from two molecular proportions of diazotized 1-amino-2-hydroxy-5-chlorbenzene and one molecular proportion of 1.3-dihydroxy-benzene and the whole is heated for three hours at 120° C. By dilution with water the disazo dyestuff containing chromium is then precipitated, filtered off by suction and dried. It dissolves in nitrocellulose lacquers giving a bluish red coloration.

Example 13

150 parts of formamide are heated for two hours at 120° C. with an aqueous solution of chromium formate corresponding to 5 parts of chromium oxide and containing 60 parts of water. The formamide is thus saponified to ammonium formate. Into the resulting ammonium formate melt containing chromium there are introduced 34 parts of the azo dyestuff from diazotized 1-amino-2-hydroxy-4-nitrobenzene and 1-phenyl-3-methyl-3-pyrazolone and the whole is stirred for four hours at 120° C. The reaction mixture is poured into a large amount of water and the deposited dyestuff is filtered off by suction and dried. The azo dyestuff containing chromium thus obtained dissolves in organic solvents and cellulose nitrate lacquers giving a bluish red coloration. The same dyestuff is obtained by carrying out the reaction in a solution of solid chromium formate in neutral ammonium formate.

The complex chromium compounds of the azo dyestuffs form diazotized 1-aminobenzene-2-carboxylic acid and 1-phenyl-3-methyl-5-pyrazolone or from diazotized 1-amino-2-hydroxy-4-nitrobenzene and 2-hydroxynaphthalene may be prepared in a corresponding manner; they dissolve in organic solvents giving yellow and blue-black colorations respectively.

Example 14

34.2 parts of the azo dyestuff from diazotized 1-amino-2-hydroxy-5-nitrobenzene and acetoacetic acid anilide are introduced into a solution, heated to 115° C. of 15 parts of cobalt acetate in 200 parts of ammonium acetate and the whole is stirred for four hours at the said temperature. The reaction mixture is then poured into water, stirred for some time and the precipitated azo dyestuff containing cobalt is filtered off by suction and dried. It is a yellow-brown powder which dissolves in cellulose nitrate lacquers and organic solvents giving a yellow coloration. The same dyestuff is obtained by using ammonium formate instead of ammonium acetate. By carrying out the reaction with the azo dyestuff from diazotized 1-amino-2-hydroxy-benzene-5-sulphamide and 2-hydroxynaphthalene a bluish red cobalt compound is obtained. The dyestuff from diazotized 1-amino-2-hydroxy-4-nitrobenzene and 2-hydroxynaphthalene yields a violet cobalt complex compound.

What we claim is:

1. A process for the production of complex metal compounds of azo dyestuffs which consists in heating azo dyestuffs free from sulfonic acid groups and capable of being converted into complex metal compounds in a liquid medium containing an agent supplying a metal capable of forming complex compounds with azo dyestuffs and, in a preponderating amount, a member selected from the group consisting of amides and ammonium salts of carboxylic acids of the aliphatic and benzene series, urea and urethanes.

2. A process for the production of complex metal compounds of azo dyestuffs which consists in heating azo dyestuffs free from sulfonic acid groups and capable of being converted into complex metal compounds in a liquid medium containing an agent supplying a metal capable of forming complex compounds with azo dyestuffs and, in a preponderating amount, an amide of a low molecular fatty acid.

3. A process for the production of complex metal compounds of azo dyestuffs which consists in heating azo dyestuffs free from sulfonic acid groups and capable of being converted into complex metal compounds in a liquid medium containing an agent supplying a metal capable of forming complex compounds with azo dyestuffs and, in a preponderating amount, formamide.

4. A process for the production of complex metal compounds of azo dyestuffs which consists in heating azo dyestuffs free from sulfonic acid groups and capable of being converted into complex metal compounds in a liquid medium containing an agent supplying a metal capable of forming complex compounds with azo dyestuffs and, in a preponderating amount, an ammonium salt of a low molecular fatty acid.

5. A process for the production of complex metal compounds of azo dyestuffs which consists in heating azo dyestuffs free from sulfonic acid groups and capable of being converted into complex metal compounds in a liquid medium containing an agent supplying a metal capable of forming complex compounds with azo dyestuffs and, in a preponderating amount, ammonium formate.

KARL HOLZACH.
HELMUT PFITZNER.